J. H. JONES.
Harvester.
No. 87,263. Patented Feb. 23, 1869.
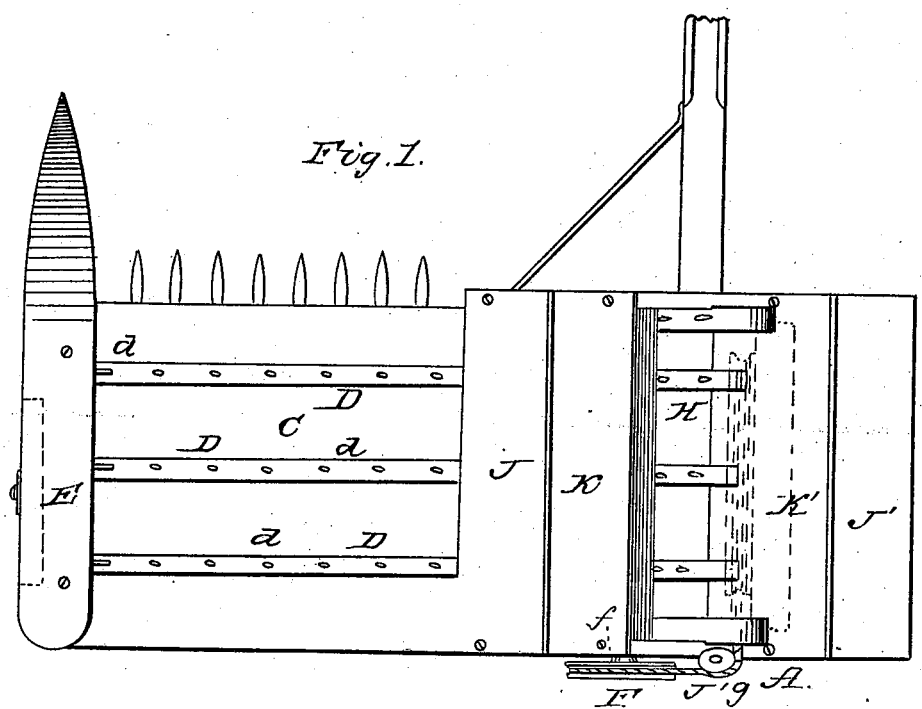
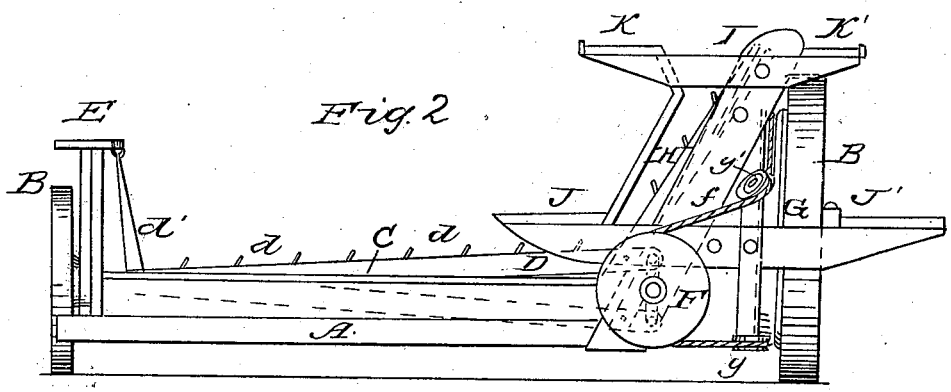

UNITED STATES PATENT OFFICE.

J. HERVA JONES, OF ROCKFORD, ILLINOIS.

IMPROVEMENT IN HARVESTERS.

Specification forming part of Letters Patent No. 87,263, dated February 23, 1869.

*To all whom it may concern:*

Be it known that I, J. HERVA JONES, of Rockford, in the county of Winnebago and State of Illinois, have invented certain new and useful Improvements in Harvesters, of which the following is a full, clear, and exact description.

My invention relates to that class of harvesters in which the cut grain is bound into bundles by persons riding on the machine, and its objects are to render the machine light of draft, simple in construction, and effective in operation; to which ends the improvements herein claimed consist, first, in a novel method, hereinafter described, of combining a receptacle, into which the cut grain is automatically fed, with a binding-table longitudinally parallel with and on the stubble side of the receptacle; second, in a novel method of combining a receptacle for the cut grain with a binding-table arranged parallel with and on the inner or grain side of the receptacle; third, in a novel method of combining an elevated receptacle for the cut grain, substantially as described, with a foot-board arranged above the platform, to allow the grain to pass beneath it and below the receptacle, to obviate the stooping of the binder; fourth, in a novel method of combining an elevated receptacle for the cut grain, which receives the grain underneath that already deposited, substantially in the manner described, with a binders' stand located on the stubble side of the machine, below the receptacle, to prevent the stooping of the binder; fifth, in a novel method of combining a receptacle into which the cut grain is fed from below, with binders' stands located on opposite sides of the driving-wheel; sixth, in a novel method of combining, with a slotted platform, carrying-bars, reciprocating endwise in the slots, suspended on the grain side from the divider by radius-bars, and mounted on the stubble side on the same crank which oscillates the elevating-bars.

In the accompanying drawings, which show one practical way of embodying all my improvements in one machine, Figure 1 represents a plan, and Fig. 2 a rear elevation, of so much of my improved binding-harvester as is necessary to illustrate the invention herein claimed.

In this instance the mechanism is shown as mounted on a main frame, A, supported upon two wheels, B B'. The platform C is, by preference, slotted parallelly to the finger-beam. Bars D move endwise in these slots, and are provided with pins $d$, inclined toward the stubble side of the machine, in order to push the grain that way. The grain ends of these bars are suspended from the divider E by radius-bars $d'$, while their stubble ends are pivoted to cranks on a shaft, $f$, driven by a band or cord, $f'$, encircling a pulley, F, on the crank-shaft, intermediate guide-pulleys $g$ $g'$, and a pulley, G, on the driving-wheel.

Reciprocating carrying-bars, sliding endwise in slots in the divider-board or grain-guard, have been used; but this mode of construction does not permit of the peculiar rising and forward, and sinking and backward, movement which I attain by the use of my radius-bars, which convey the grain so effectually.

Inclined bars $h$, moving endwise in suitable guides, are also pivoted to this same crank-shaft, and serve to convey the grain upward through the grain-passage into a receptacle, I, situated at the top of the grain-passage H.

In the drawing this receptacle is shown as being simply an enlargement of the passage above the carrying-bars; but in a full-sized machine it would form a large box, in which the grain would be comparatively undisturbed until bound, and the bottom of this box would be far above the binders' foot-boards or stands. A stand, J, large enough for one or more binders, is arranged above the platform, and on the inner or grain side of the grain-receptacle, in such manner as to leave room for the passage of the grain beneath it on its way to the receptacle I. A binding-table, K, is arranged above the stand J, and parallel with the receptacle. A similar table, K', and stand J' are arranged on the opposite side of the receptacle.

In light grain one binder is sufficient; but in heavy grain two or more are required.

In this instance I have shown the receptacle as arranged so close to the driving-wheel as to admit of the outer table being arranged above the wheel, and the corresponding stand on the outside of the driving-wheel.

This enables me to diminish the width of the machine, and consequently to lessen the side draft, and to balance the machine more evenly.

The grain may, if preferred, be bound while in the receptacle, without using the tables.

By arranging the stands parallel with the receptacle, the binders can work facing the receptacle, and without having to turn partially around every time a bundle is grasped, as is the case in other machines of this class; and as the receptacle is elevated and the grain is conveyed into it automatically from beneath, the binders need not stoop while working, and are not interrupted by grain falling over into the receptacle.

The machine is, of course, to be provided with proper gearing, cutting apparatus, reel, and other requisites of a fully-organized machine.

I have described the construction of the machine I prefer; but it is obvious that the details of construction might be varied within certain limits without departing from the spirit of my invention. For instance, an endless-apron conveyer might be substituted for the slats described; the rake might also be driven by gearing. I have also sometimes used independent belts for conveying the grain into the receptacle.

What I claim as my invention, and desire to secure by Letters Patent, is—

1. The arrangement, as set forth, of the elevated grain-receptacle and grain-elevating mechanism described, and a binding-table longitudinally parallel with and on the stubble side of the receptacle, for the purposes specified.

2. The combination, as set forth, with the elevated grain-receptacle, of a binding-table longitudinally parallel with and on the grain side of the receptacle, for the purposes set forth.

3. The combination of the raised foot-board, beneath which the cut grain passes, with an elevated receptacle, I, the bottom of which is arranged above the foot-board, as and for the purposes set forth.

4. The combination, substantially as set forth, of the receptacle elevated above the platform, and which receives the grain underneath that already deposited therein, with a binders' stand located on the stubble side of the machine, and below the receptacle, for the purpose specified.

5. The combination, substantially as set forth, of a receptacle into which the cut grain is fed, underneath that already deposited, with binders' stands located on opposite sides of the driving-wheel.

6. The combination of the slotted platform, the carrying-bars, their radius-bars $d'$, and the elevating-bars with the crank-shaft, as and for the purposes described.

In testimony whereof I have hereunto subscribed my name.

J. HERVA JONES.

Witnesses:
 J. G. MANLOVE,
 BYRON GRAHAM.